United States Patent
Franco et al.

(10) Patent No.: US 12,486,547 B2
(45) Date of Patent: Dec. 2, 2025

(54) DIRECT REDUCTION SYSTEM AND RELATIVE PROCESS

(71) Applicants: DANIELI & C. OFFICINE MECCANICHE S.p.A., Buttrio (IT); HYL TECHNOLOGIES, S.A. DE C.V., Nuevo León (MX)

(72) Inventors: Barbara Franco, Pradamano (IT); Alessandro Martinis, Pozzuolo del Friuli (IT); Jorge Eugenio Martinez Miramontes, Nuevo Leon (MX)

(73) Assignees: DANIELI & C. OFFICINE MECCANICHE S.P.A., Buttrio (IT); HYL TECHNOLOGIES, S.A. DE C.V., Leon (MX)

( * ) Notice: Subject to any disclaimer, the term of this patent is extended or adjusted under 35 U.S.C. 154(b) by 443 days.

(21) Appl. No.: 18/002,770

(22) PCT Filed: Jun. 28, 2021

(86) PCT No.: PCT/EP2021/067704
§ 371 (c)(1),
(2) Date: Dec. 21, 2022

(87) PCT Pub. No.: WO2021/260225
PCT Pub. Date: Dec. 30, 2021

(65) Prior Publication Data
US 2023/0243004 A1 Aug. 3, 2023

(30) Foreign Application Priority Data
Jun. 26, 2020 (IT) .................. 102020000015472

(51) Int. Cl.
*C21B 5/06* (2006.01)
*C21B 13/00* (2006.01)

(52) U.S. Cl.
CPC ............ *C21B 5/06* (2013.01); *C21B 13/0073* (2013.01); *C21B 2100/26* (2017.05); *C21B 2100/282* (2017.05); *C21B 2100/66* (2017.05)

(58) Field of Classification Search
CPC ... C21B 5/06; C21B 13/0073; C21B 2100/26; C21B 2100/282; C21B 2100/66; C21B 13/004; C21B 2100/22; C21B 2100/28
(Continued)

(56) References Cited

U.S. PATENT DOCUMENTS

| | | | |
|---|---|---|---|
| 5,110,350 A | 5/1992 | Villarreal-Trevino et al. |
| 6,033,456 A | 3/2000 | Jahnke |

(Continued)

FOREIGN PATENT DOCUMENTS

| | | |
|---|---|---|
| CN | 102232119 A | 11/2011 |
| CN | 102712959 A | 10/2012 |

(Continued)

OTHER PUBLICATIONS

Patent Cooperation Treaty, International Search Report and Written Opinion for International Application No. PCT/EP2021/067704, mailed Nov. 10, 2021, 13 pages.

(Continued)

*Primary Examiner* — Jessee R Roe
*Assistant Examiner* — Michael Aboagye
(74) *Attorney, Agent, or Firm* — Stetina Garred Brucker & Newboles

(57) ABSTRACT

The present invention provides a reduction system and method that can be operated with any proportion of gaseous hydrogen-containing gases and gaseous hydrocarbon-containing gases having the possibility of continuing its operation, ensuring an high process availability and negligible loss of production, when the gaseous hydrogen-containing gas for any reason is not available and allow the substitution (Continued)

of the gaseous hydrogen-containing gas with a gaseous hydrocarbon-containing gas with minor adjustments in the plant operation. The reduction system of the invention is designed to be implemented in new and already built direct reduction plants to operate efficiently and has lower capital and operation costs.

18 Claims, 2 Drawing Sheets

(58) Field of Classification Search
USPC .......... 266/156, 155, 197; 75/496, 490, 505, 75/503
See application file for complete search history.

(56) References Cited

U.S. PATENT DOCUMENTS

| | | | |
|---|---|---|---|
| 6,039,916 A | | 3/2000 | Celada-Gonzalez et al. |
| 7,608,129 B2 * | | 10/2009 | Zendejas-Martinez ..................... C21B 13/029 75/505 |
| 8,940,076 B2 * | | 1/2015 | Duarte-Escareno .... C21B 13/02 75/505 |
| 9,638,468 B2 * | | 5/2017 | Sakaguchi ......... B01D 53/1462 |
| 9,938,595 B2 * | | 4/2018 | Becerra-Novoa ....... C21B 13/02 |
| 11,203,791 B2 * | | 12/2021 | Condosta ............ C21B 13/0073 |
| 2016/0002744 A1 | | 1/2016 | Becerra-Novoa et al. |

FOREIGN PATENT DOCUMENTS

| | | |
|---|---|---|
| CN | 103261446 A | 8/2013 |
| DE | 2459814 B1 | 4/1976 |
| DE | 202020100640 U1 | 4/2020 |
| EP | 0428098 A2 | 5/1991 |
| JP | 2003-261316 A | 9/2003 |
| JP | 2014-227588 A | 12/2014 |
| WO | 2017046653 A1 | 3/2017 |

OTHER PUBLICATIONS

Chinese Office Action for Application No. 2024120700201390; mailed Dec. 7, 2024.
Office Action for Japanese Patent Application No. 2022-579999; mailed May 1, 2025.

* cited by examiner

DIRECT REDUCTION SYSTEM AND RELATIVE PROCESS

CROSS-REFERENCE TO RELATED APPLICATIONS

This application claims priority to PCT International Application No. PCT/EP2021/067704 filed on Jun. 28, 2021, which application claims priority to Italian Patent Application No. 102020000015472 filed on Jun. 26, 2020, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention relates to a direct reduction system and relative process, adapted, in particular, for the production of metallic iron by means of direct reduction of iron oxides using reducing gas.

Background

Systems for the production of reduced iron ore (DRI—Direct Reduced Iron) of the known type comprise a reactor, into which iron oxide is loaded, in the form of pellets and/or lumps, and a line for treating and supplying reducing gas, comprising hydrogen and carbon monoxide and adapted to reduce said iron oxide in the reactor. The reducing gas is injected into a reaction chamber, or reactor, at a high temperature. The reactor can be of the static-bed type, or of the moving-bed type, or of the fluidized-bed type, or of the rotary or kiln type. In a moving-bed reactor, the reducing gas is typically introduced into the central part of the reactor, made to go up in counter-flow through the iron oxide, and then extracted, reprocessed and recycled in a reduction circuit. The exhaust gas exiting the reactor is de-dusted, deprived of the reaction products ($H_2O$ and $CO_2$) and compressed; it is then mixed with a make-up gas (natural gas, COG, gas obtained in a reformer, Corex Gas, Syn Gas etc.). The flow of gas, defined by the mixture of the new make-up gas and the exhaust gas recycled after appropriate treatment, is sent to a heating unit, which brings it to the temperature required by the reduction process, normally above 850° C.

The heated flow of reducing gas, into which oxygen can be injected with the object of increasing the temperature thereof even further, is sent to the reactor, into which the iron oxides to be reduced, in the form of pellets and/or lumps, are introduced from above and flow downwardly there-through, while the DRI (reduction product) is extracted at the opposite end of said reactor and sent by a pneumatic transport system or by gravity or by belts to a blast furnace or an electric arc furnace or to an oxygen converter or to any device able to melt the produced DRI.

In greater detail, in the iron oxide direct reduction process, the oxygen is removed from the iron ore by means of chemical reactions with hydrogen and carbon monoxide, in order to obtain DRI with a high level of metallization (ratio between metallic iron and total iron contained in the DRI).

The overall reduction reactions involved in the process are well-known and they are shown below:

$$Fe_2O_3 + 3H_2 \rightarrow 2Fe + 3H_2O \quad (1)$$

$$Fe_2O_3 + 3CO \rightarrow 2Fe + 3CO_2 \quad (2).$$

The hydrogen and carbon monoxide react with the oxygen of the iron oxide and are transformed into water and carbon dioxide according to the reactions (1) and (2). Besides $H_2O$ and $CO_2$, unreacted $H_2$ and CO are also present in the exhaust gas exiting the reactor. The exhaust gas is treated as described above with the object of recovering these reducers.

The use of a make-up gas fed to the reduction circuit containing a significant amount of carbon (a gaseous hydrocarbon-containing gas such as Natural Gas, Coke Oven Gas, Corex Gas, SynGas etc.) principally has two disadvantages:
   greenhouse gas emissions ($CO_2$);
   a relatively high content of carbon monoxide (CO) in the flow of reducing gas entering the reactor, which can result in a relatively high fines production during the reduction reaction and, because of the increase in temperature due to the reduction with carbon monoxide, which is exothermic, it can increase the risk of generating clusters, hindering the movement of the solid mass.

In the scheme of a currently-used process, the $CO_2$ emissions are reduced by the selective removal of $CO_2$ from the exhaust gas recycled to the reactor (which can be stored and used in the food industry or for other industrial applications) and such emissions mainly consist of carbon dioxide released through the chimney of a hydrocarbon gas reformer (where present) or of the heating unit of the reducing gas.

With respect to other known direct reduction processes, the process described above, which is supplied with natural gas to promote methane reforming reactions inside the reduction reactor, or which is supplied with reformed gas produced by an off-line reformer, nonetheless guarantees a good $H_2/CO$ ratio in the composition of the reducing gas, which is introduced into the reactor.

At present, a further reduction in $CO_2$ emissions is extremely difficult.

Thus, the need is felt to develop a direct reduction system and relative process capable of overcoming the aforesaid drawbacks.

SUMMARY OF THE INVENTION

It is an object of the present invention to develop a direct reduction system and relative process to allow a further reduction in carbon dioxide emissions, that in some embodiments is advantageously below 40 $Nm^3/t_{DRI}$.

It is a further object of the present invention to develop a direct reduction system which is flexible in terms of make-up gas, that means able to be fed, without upsetting the equipment of the reduction circuit and/or without long shut down periods, with different types of make-up gas or even mixtures thereof, these changes in make-up gas feed being chosen on the basis of market availability or costs.

The present invention achieves such objects and other objects, which will become apparent in the light of the present description, by means of a direct reduction system for a direct reduction of iron oxides, which comprises a circuit provided with:
   a reactor having a reduction area adapted for being loaded with said iron oxides;

a first external source of make-up gaseous hydrogen-containing gas with a gaseous hydrogen content equal to at least 80% in volume;

a second external source of make-up gaseous hydrocarbon-containing gas, preferably with a gaseous hydrocarbon content equal to at least 25% in volume;

a recovery and treatment line, placed downstream of the reactor, for recovering and treating the exhaust gas exiting the reactor;

a treatment and feeding line, placed upstream of the reactor, for treating a process gas, obtained by mixing the make-up gaseous hydrogen-containing gas coming from the first external source and/or the make-up gaseous hydrocarbon-containing gas coming from the second external source with the exhaust gas treated in the recovery and treatment line, and for feeding the reduction area of the reactor with said process gas;

wherein the recovery and treatment line communicates downstream with said treatment and feeding line;

wherein the recovery and treatment line comprises at least one first heat-exchange device where heat is transferred from the exhaust gas to a heat-transfer fluid;

wherein the treatment and feeding line comprises at least one second heat-exchange device;

wherein a duct, able to carry the heat-transfer fluid, connects the at least one first heat-exchange device to the at least one second heat-exchange device whereby the heat of the heat-transfer fluid can be transferred to said process gas by means of said at least one second heat-exchange device;

wherein the recovery and treatment line also comprises at least one carbon dioxide removal device, for removing carbon dioxide from the exhaust gas;

wherein the duct has a branch connecting said duct to the at least one carbon dioxide removal device whereby the heat of the heat-transfer fluid can be completely or partially transferred to said at least one carbon dioxide removal device;

and wherein said first external source and said second external source are connected to said treatment and feeding line or to said recovery and treatment line.

Preferably, the at least one second heat exchanger is placed between a humidifier and a heating unit, said humidifier and said heating unit being provided in said treatment and feeding line.

Optionally, the at least one first heat-exchange device is placed between the reactor and at least one washing and cooling unit for removing water from the exhaust gas, obtaining a dehydrated gas, said at least one washing and cooling unit being provided in said recovery and treatment line.

Preferably, there is provided a further duct connecting a discharge line of the at least one washing and cooling unit to the humidifier for carrying hot water to the humidifier.

In this description, the term "process gas" means the mixture of gases obtained by mixing the make-up gaseous hydrogen-containing gas coming from the first external source and/or the make-up gaseous hydrocarbon-containing gas coming from the second external source with the exhaust gas treated in the recovery and treatment line.

According to a further aspect of the invention, a direct reduction process is provided, which can be carried out by means of the aforesaid system, which comprises the following steps when fully operational:

a) recovering and treating the exhaust gas exiting the reactor by means of the recovery and treatment line;

b) feeding process gas to a reduction area of the reactor by means of the treatment and feeding line, said process gas being obtained by mixing the make-up gaseous hydrogen-containing gas coming from the first external source and/or the make-up gaseous hydrocarbon-containing gas coming from the second external source with the exhaust gas treated in the recovery and treatment line;

wherein there are further provided the steps of:

transferring heat from the exhaust gas exiting the reactor to a heat-transfer fluid by means of the at least one first heat-exchange device of the recovery and treatment line;

and if the make-up gaseous hydrogen-containing gas coming from the first external source is sufficient, mixed with the exhaust gas treated in the recovery and treatment line, for the direct reduction process, heat of the heat-transfer fluid is completely transferred to said process gas by means of the duct carrying the heat-transfer fluid to the at least one second heat-exchange device of the treatment and feeding line, whereas if the make-up gaseous hydrogen-containing gas coming from the first external source is not available or not sufficient, mixed with the exhaust gas treated in the recovery and treatment line, for the direct reduction process, make-up gaseous hydrocarbon-containing gas coming from the second external source is mixed with said exhaust gas, or with said exhaust gas and said make-up gaseous hydrogen-containing gas, and the heat of the heat-transfer fluid is respectively completely, or partially, transferred to said at least one carbon dioxide removal device.

The first external source of make-up gas can be a source of commercially pure gaseous hydrogen or a source of reducing gas enriched with gaseous hydrogen, with a gaseous hydrogen content equal to at least 80% in volume. The make-up gaseous hydrogen-containing gas can come from any external source, which uses, for example, the partial combustion or reforming of natural gas, electrolysis or any other process capable of generating such a type of gas.

The second external source of make-up gas can be a source of a gaseous hydrocarbon-containing gas, preferably with a gaseous hydrocarbon content equal to at least 25% in volume, such as Natural Gas, Coke Oven Gas, Corex Gas, SynGas etc.

The system and method of the present invention allow DRI to be produced by feeding the circuit with only make-up gaseous hydrogen-containing gas, or with only make-up gaseous hydrocarbon-containing gas, or with a mixture, in any proportions, of make-up gaseous hydrogen-containing gas and make-up gaseous hydrocarbon-containing gas according to any particular availability and convenience.

Preferably, the system and method of present invention therefore allow for a continuous switch from traditionally available reducing gas sources (Natural Gas, Coke Oven Gas, Reformed Gas, Corex Gas, etc.) to newly available environmental friendly reducing gas sources (gaseous hydrogen or gaseous hydrogen enriched gas), without the need of relevant plant modifications but only through adjustment of some working process parameters.

Instead, in particular, prior art technologies cannot switch straightforward to gaseous hydrogen use in high proportion without incurring before into a step of plant redesign and relevant modifications.

As an example, said working process parameters can be the system pressure or the injected nitrogen amount.

When the system works using only make-up gaseous hydrocarbon-containing gas, the pressure of the system, measured at the exit of the reactor, will be higher (for example between 5 and 7 barg) than the system pressure when the system works using only make-up gaseous hydrogen-containing gas (where, for example, the pressure can be adjusted between 3 and 5 barg). When working with a mixture of make-up gaseous hydrocarbon-containing gas and make-up gaseous hydrogen-containing gas, the system pressure will be an intermediate pressure.

In an example, adjusting the operating pressure of the system allows to partially or completely compensate the different features of the gas circulating in the system, said different features being due to the different percentages of use of the make-up gaseous hydrocarbon-containing gas and make-up gaseous hydrocarbon-containing gas. In this way, the fluid dynamic response of the machines arranged in the system circuit will be substantially equivalent both working with a high pressure hydrocarbon-containing gas (high molecular weight gas) and working with a low pressure hydrocarbon-containing gas (low molecular weight gas).

In particular, in order to partially or completely compensate the different features of the gas circulating in the system, there is provided an injection of nitrogen both for increasing the molecular weight of the circulating process gas without changing its reducing characteristics and for using the nitrogen present in the circulating gas as a vector of thermal energy inside the reduction reactor. More in detail, the passage from the use of make-up gaseous hydrocarbon-containing gas to make-up gaseous hydrogen-containing gas produces a pressure decompensation, in particular at the pumping devices 42, 42' respectively provided on the ducts 40 and 54. A possible solution is to inject nitrogen in the circuit when make-up gaseous hydrogen-containing gas is used. In this way the mixture of reducing gas is heavier and the pumping device works optimally.

Preferably, the injection of nitrogen, or other suitable gas (for example $CO_2$) is carried out at the pumping device.

In some preferred embodiments of the invention the heat-transfer fluid is water whereby steam is produced in the first heat exchanger and is carried through the duct connecting said first heat exchanger with the second heat exchanger.

The steam, or other heat-transfer fluid, coming from the first heat exchanger can be used in the second heat exchanger to increase the temperature of the process reducing gas going to the heating unit, thus decreasing the energy consumption.

If a gaseous hydrogen-containing gas is not available and the system needs to work with a gaseous hydrocarbon-containing gas, such as natural gas or coke oven gas or syngas or other type of reducing gas, the steam, or other heat-transfer fluid, coming from the first heat exchanger can be easily diverted to the carbon dioxide removal device for removing, for example absorbing, carbon dioxide in order to regenerate amine solution.

The steam, or other heat-transfer fluid, can be flexibly used to preheat the process reducing gas in the second heat exchanger and/or used in the operation of the removal device for removing carbon dioxide. The amount of steam, or other heat-transfer fluid, destined for each use is flexibly set according to the proportion of the amount of gaseous hydrogen-containing gas and the amount of gaseous hydrocarbon-containing gas fed to the circuit of the reduction system.

In brief, the direct reduction system of the invention is capable of adapting to operate using as make-up gas a wide variety of gaseous hydrocarbon-containing gas sources and/ or gaseous hydrogen-containing gas sources or other reducing gas sources emerging over the years, without upsetting the equipment and allowing a live change between one source to the other.

Another advantage of the present invention is the possibility of continuing the operation, ensuring a high process availability and negligible loss of production, when the gaseous hydrogen-containing gas for any reason is not available.

In fact the configuration of the system allows the substitution of the gaseous hydrogen-containing gas with a gaseous hydrocarbon-containing gas with simple adjustments in the system operation.

Optionally, an injection of further gaseous hydrocarbon-containing gas, such as natural gas, can be provided in a lower, preferably conical, area of the reactor placed below the reduction area, by means of at least one device for injecting said further gaseous hydrocarbon-containing gas.

Below are some of the further advantages of the solution of the present invention with respect to the state of the art:
- the device for removing, for example absorbing, carbon dioxide can be partially or totally by-passed, according to the percentage of make-up gaseous hydrocarbon-containing gas present in the feed mix;
- the possible humidifier, required to increase the water content in the process gas, thus preventing the depositing of carbon inside the process gas heating unit, can be completely bypassed by a simple further by-pass duct when only make-up gaseous hydrogen-containing gas is fed to the circuit;
- in general, by increasing gaseous hydrogen content in the gas fed to the circuit, the depositing of carbon inside the heating unit is extremely limited, if any, and system stops are not necessary to carry out chemical cleaning, thus increasing system reliability and availability;
- when the flow of reducing gas is pure gaseous hydrogen or almost pure gaseous hydrogen, no additional energy is required to promote the reforming reactions inside the reactor, thus the injection of oxygen downstream of the heating unit can be switched off;
- since the resulting process gas preferably has a rather low CO and $CO_2$ content, the acidification of the process water, which comes into contact with the process gas, is extremely limited and does not require costly materials on the water return lines or elevated consumptions of chemical agents to control the quality of the water;
- the high iron ore reduction level with the gaseous hydrogen, which determines a reduction in temperature inside the reactor, allows more regular operations, which are almost devoid of clustering risks (which is typical in reduction with CO and the exothermic reaction thereof, as is swelling);
- the direct introduction into the circuit of commercially-pure gaseous hydrogen or a gaseous hydrogen-containing gas with an elevated gaseous hydrogen content increases the efficiency of the current gaseous hydrocarbon-containing gas (such as natural gas or coke oven gas) based direct reduction systems (such as the ZR process or processes with an in line reformer);
- the phenomenon of pellet swelling on starting up the reactor is minimized, said phenomenon being characteristic in the use of CO as a reducing agent, which can cause the stopping of the solid flow and clogging of the reactor.

Further features and advantages of the invention will become more apparent in the light of the detailed description of illustrative, but non-exclusive embodiments.

The dependent claims describe particular embodiments of the invention.

BRIEF DESCRIPTION OF THE FIGURES

Reference is made in the description of the invention to the appended drawing tables, which are given by way of non-limiting examples, wherein.

DESCRIPTION OF ILLUSTRATIVE EMBODIMENTS OF THE INVENTION

Figure 1:
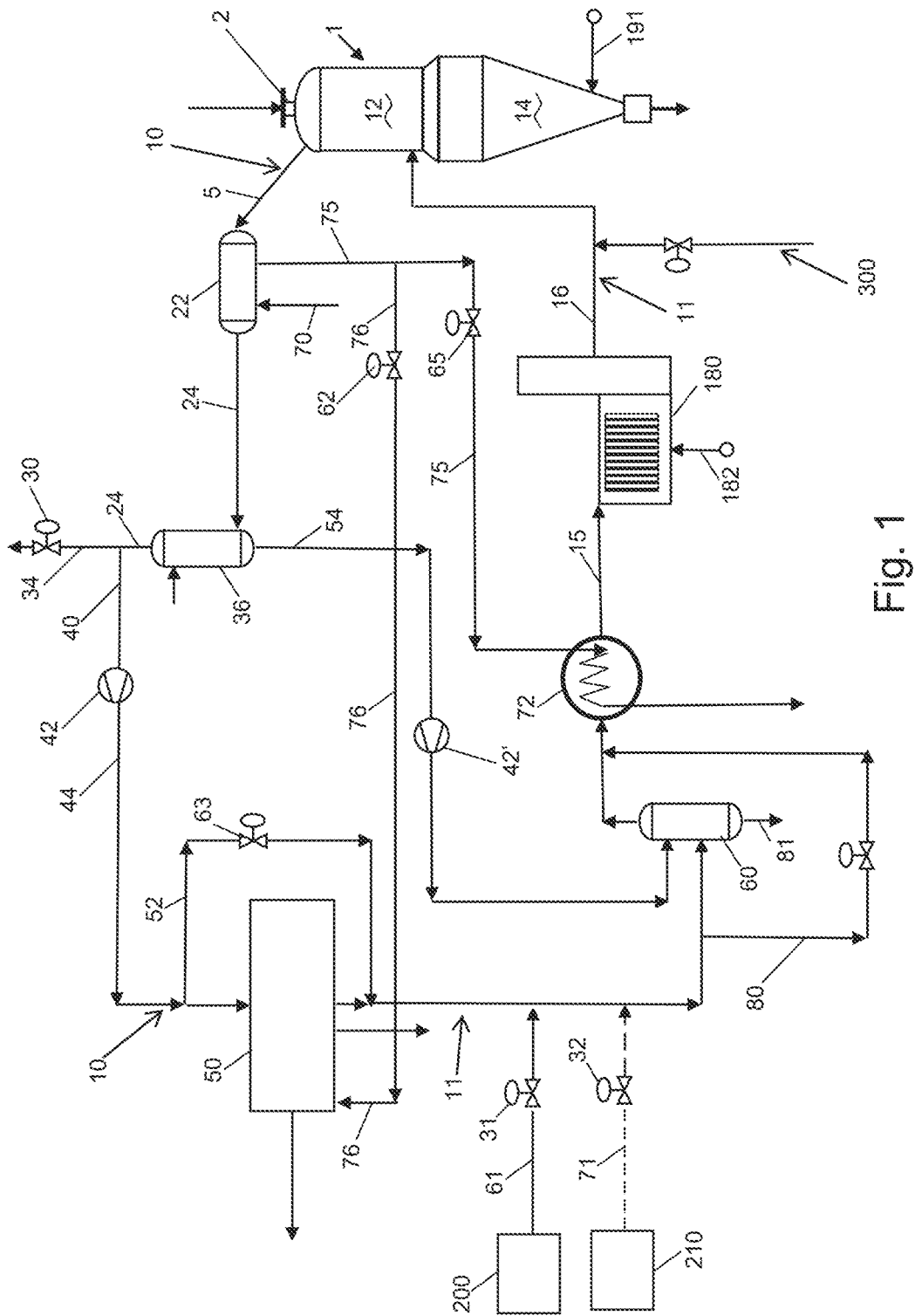
FIG. 1 illustrates a diagram of a first embodiment of a direct reduction system according to the invention.

Some examples of a direct reduction system, which forms the subject of the present invention, are illustrated with reference to the FIGS. 1 and 2, comprising a circuit provided with:

- a reactor 1 having a reduction area 12 adapted for being loaded with iron oxides through an inlet duct 2;
- a first external source 200 of make-up gaseous hydrogen-containing gas with a gaseous hydrogen content, or hydrogen gas content, equal to at least 80% in volume;
- a second external source 210 of make-up gaseous hydrocarbon-containing gas, preferably with a gaseous hydrocarbon content equal to at least 25% in volume;
- a recovery and treatment line 10, placed downstream of the reactor 1, for recovering and treating the exhaust gas exiting the reactor 1;
- a treatment and feeding line 11, placed upstream of the reactor 1, for treating a mixture of gases, defining a process gas, obtained by mixing the make-up gaseous hydrogen-containing gas coming from the first external source 200 and/or the make-up gaseous hydrocarbon-containing gas coming from the second external source 210 with the exhaust gas treated in the recovery and treatment line 10, and for feeding the reduction area 12 of the reactor 1 with said process gas.

The recovery and treatment line 10 communicates downstream with said treatment and feeding line 11.

The recovery and treatment line 10 comprises at least one first heat-exchange device 22, for example only one first heat-exchange device, where heat is transferred from the exhaust gas to a heat-transfer fluid 70.

Advantageously, the treatment and feeding line 11 comprises at least one second heat-exchange device 72, for example only one second heat-exchange device, and there is provided a duct 75, preferably only one duct 75, able to carry the heat-transfer fluid and connecting the first heat-exchange device 22 to the second heat-exchange device 72 whereby the heat of the heat-transfer fluid can be transferred to the process gas by means of the second heat-exchange device 72.

Furthermore, the recovery and treatment line 10 also comprises at least one carbon dioxide removal device 50, for example only one removal device, for removing, for example absorbing, carbon dioxide from the exhaust gas.

Advantageously, the duct 75 has a branch 76 connecting said duct 75 to the carbon dioxide removal device 50 whereby the heat of the heat-transfer fluid can be completely or partially transferred to said removal device 50 if the make-up gaseous hydrogen-containing gas is not available or is only partially available, respectively.

Preferably, in order to better adjust the operation of the direct reduction system on the basis of input data including, or consisting of, availability data of the make-up gaseous hydrogen-containing gas, the system of the invention comprises:

- a by-pass duct 52 in the recovery and treatment line 10 for bypassing the removal device 50;
- a first flow rate adjusting device 62, placed along the branch 76, for adjusting the flow rate of the heat-transfer fluid towards the removal device 50;
- a second flow rate adjusting device 65, along the duct 75 for adjusting the flow rate of the heat-transfer fluid towards the second heat-exchange device 72;
- a third flow rate adjusting device 63 for closing or at least partially opening the by-pass duct 52;
- a fourth flow rate adjusting device 32 for adjusting the flow rate of the make-up gaseous hydrocarbon-containing gas to be fed to the gas circulation circuit;
- a fifth flow rate adjusting device 31 for adjusting the flow rate of the make-up gaseous hydrogen-containing gas to be fed to the gas circulation circuit.

Figure 2:
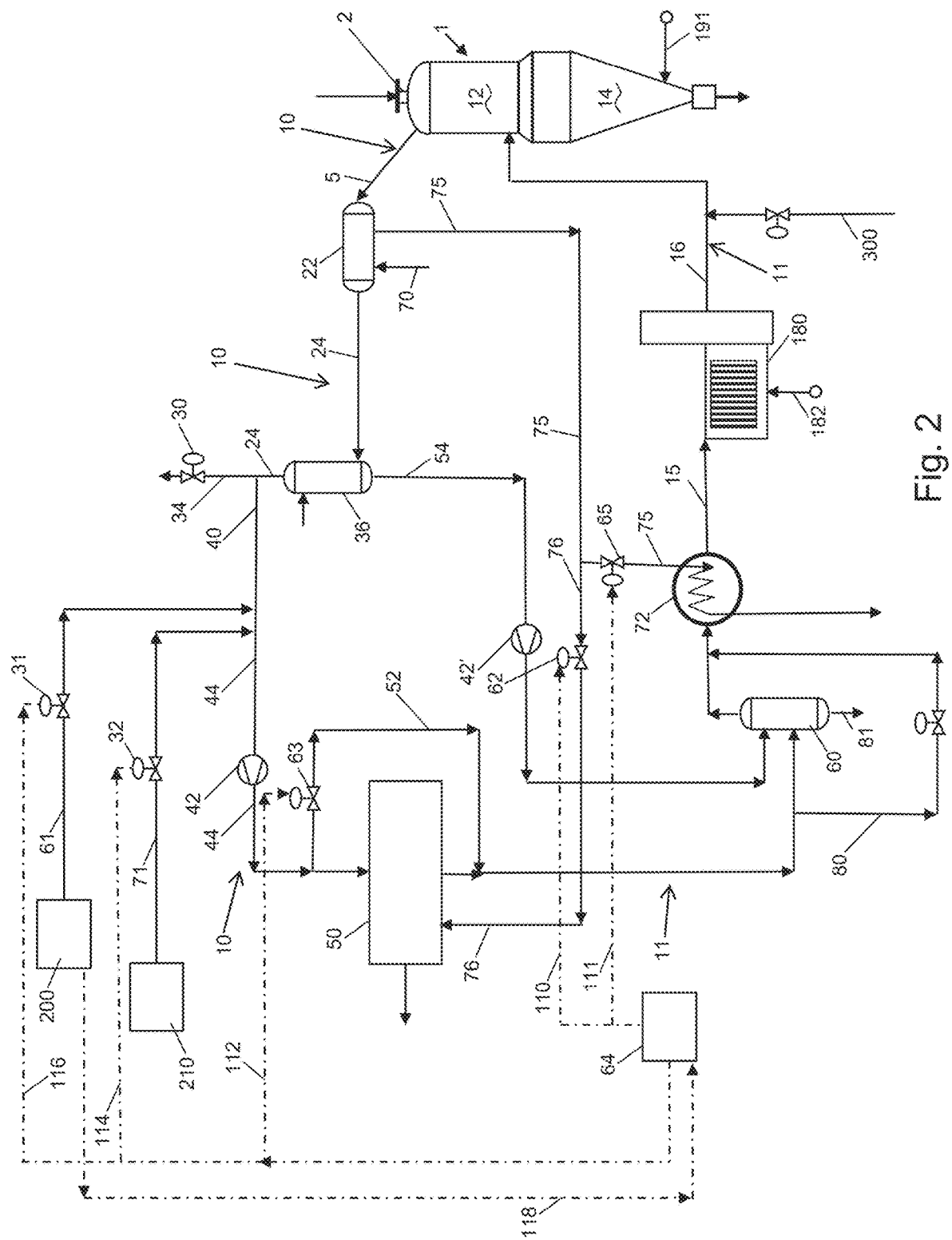
FIG. 2 illustrates a diagram of a second embodiment of a direct reduction system according to the invention.

Optionally, as shown for example in FIG. 2, a control unit 64 is configured for respectively sending a control signal 110 to said first flow rate adjusting device 62, a control signal 111 to said second flow rate adjusting device 65, a control signal 112 to said third flow rate adjusting device 63, a control signal 114 to said fourth flow rate adjusting device 32 and a control signal 116 to said fifth flow rate adjusting device 31 according to input data including a signal 118 indicative of the availability of the make-up gaseous hydrogen-containing gas. The control unit 64 can also be provided in the embodiment of FIG. 1.

Advantageously, in all of the embodiments of the invention, the first external source 200 of make-up reducing gas is a source of commercially pure gaseous hydrogen (at least 99% in volume) or a source of gas with a gaseous hydrogen content equal to at least 80% in volume, preferably equal to at least a value from 85 to 98% in volume.

In case of a make-up gaseous hydrogen-containing gas with a gaseous hydrogen content equal to at least 80% in volume, the rest of the composition can comprise carbon monoxide, water, carbon dioxide, methane, nitrogen.

Purely by way of example, a make-up gaseous hydrogen-containing gas composition can be as follows in volume percentage:

gaseous hydrogen within the range 92-96%;
carbon monoxide within the range 1.5-2.5%;
water 0.2-0.6%;
carbon dioxide 0.0-0.4%;
methane 0.3-0.9%;
nitrogen 2.0-4.0%.

The second external source 210 of make-up reducing gas is a source of a gaseous hydrocarbon-containing gas with a gaseous hydrocarbon content equal to at least 25% in volume, such as Natural Gas, Coke Oven Gas, Corex Gas, SynGas etc.

Said gaseous hydrocarbon-containing gas can also be gas from biomass, biogas or bio-methane.

Said second external source 210 is normally closed but, in case of poor or none availability of said make-up gaseous hydrogen-containing gas, can be opened to use said gaseous hydrocarbon-containing gas in the circuit.

Preferably, the at least one first heat-exchange device 22 is proximal to the reactor 1, whereas said at least one removal device 50 is distal from the reactor 1 and proximal to the treatment and feeding line 11.

Advantageously, in all of the embodiments, the treatment and feeding line 11 can comprise or can consist of:

first ducts through which the process gas, obtained by mixing the treated exhaust gas coming from the reactor 1 with the make-up reducing gas coming from the first external source 200 and/or the second external source 210, is adapted to pass;

at least one humidifier 60, for example only one humidifier, for adjusting the water content of the process gas in case of high $CH_4$ and heavy gaseous hydrocarbons content in said process gas;

the second heat exchanger 72, for example a condenser, for recovering the thermal energy of the heat-transfer fluid coming from the first heat exchanger 22;

at least one heating unit 180, for example only one heating unit, for heating the process gas at a temperature appropriate for the introduction in the reactor 1.

The humidifier 60 can be completely bypassed by a simple further by-pass duct 80 when only make-up gaseous hydrogen-containing gas is fed to the circuit.

Downstream of said heating unit 180, an oxygen injection device 300 can be provided for injecting oxygen into the flow of process gas.

A further advantage of the system of the invention is represented by the fact that the recovery and treatment line 10 can comprise or can consist of:

second ducts through which the exhaust gas exiting the reactor 1 is adapted to pass;

the first heat exchanger 22, for example only one first heat exchanger, for cooling the exhaust gas exiting the reactor 1;

at least one washing and cooling unit 36, for example only one washing and cooling unit, arranged downstream of said first heat exchanger 22 for removing water from the exhaust gas, obtaining a dehydrated gas;

preferably at least one pumping device 42, for example only one pumping device, for pumping the dehydrated gas towards the treatment and feeding line 11;

the carbon dioxide removal device 50, for example an absorbing device, arranged downstream of said at least one washing and cooling unit 36, preferably downstream of said pumping device 42; and the by-pass duct 52 for bypassing the removal device 50 when the make-up reducing gas fed to the circuit is only the make-up gaseous hydrogen-containing gas.

Optionally, the humidifier 60 of the treatment and feeding line 11 receives hot water by means of a duct 54 coming from the discharge line of the washing and cooling unit 36 and discharges the water through a duct 81.

Preferably, the second ducts of the recovery and treatment line 10 comprise, downstream of the washing and cooling unit 36:

a branching duct 34, which connects the recovery and treatment line 10 to the burners of the heating unit 180, and in which a first flow of dehydrated exhaust gas can be sent as combustible gas for said burners;

and a branching duct 40, which connects the recovery and treatment line 10 to the treatment and feeding line 11 and along which the possible pumping device 42 and the carbon dioxide removal device 50 are arranged, and in which a second flow of dehydrated exhaust gas is recirculated.

A further adjusting device 30, for example a pressure control valve, is preferably provided along the branching duct 34.

The heating unit 180 is supplied by the combustion of an appropriate combustible from a source 182. The combustible can be dehydrated exhaust gas, coming from the branching duct 34, or pure gaseous hydrogen or natural gas or other hydrocarbon-containing gases or mixtures thereof.

In a first embodiment of the system of the invention, shown in FIG. 1, the external source 200 of the gaseous hydrogen-containing gas, with a gaseous hydrogen content equal to at least 80% in volume, and the external source 210 of the gaseous hydrocarbon-containing gas, with a gaseous hydrocarbon content equal to at least 25% in volume, are connected, for example directly, to the treatment and feeding line 11.

In particular, both said first external source 200 and said second external source 210 are connected to a stretch of the circuit comprised between the pumping device 42 of the recovery and treatment line 10 and the heating unit 180 of the treatment and feeding line 11, preferably between the carbon dioxide removal device 50, or the by-pass duct 52, of the recovery and treatment line 10 and the humidifier 60 of the treatment and feeding line 11.

The flow rate adjusting device 31, for example a pressure control valve, is preferably provided along the duct 61, which connects the external source 200 to the treatment and feeding line 11. Analogously, the flow rate adjusting device 32, for example a further pressure control valve, is preferably provided along the duct 71, which connects the external source 210 to the treatment and feeding line 11.

In a second embodiment of the system of the invention, shown in FIG. 2, the external source 200 of the gaseous hydrogen-containing gas and the external source 210 of the gaseous hydrocarbon-containing gas are connected, for example directly, to the recovery and treatment line 10.

In particular, both the first external source 200 and the second external source 210 are connected to a stretch of the circuit comprised between the washing and cooling unit 36 and the pumping device 42, for example, along the branching duct 40. In this way, the make-up reducing gases can also be dispensed at low pressure from the external sources 200 and 210, subsequently being compressed by the subsequent pumping device 42.

The flow rate adjusting device 31, for example a pressure control valve, is preferably provided along the duct 61, which connects the external source 200 to the recovery and treatment line 10.

The flow rate adjusting device 32, for example a further pressure control valve, is preferably provided along the duct 71, which connects the external source 210 to the recovery and treatment line 10.

Both in the first embodiment and in the second embodiment of the system of the invention at least one gaseous hydrocarbon-containing gas injection device 191 can be comprised to inject gaseous hydrocarbon-containing gas, such as natural gas or coke oven gas or gas from biomass or biogas or bio-methane, in a lower, preferably conical, area 14 of the reactor 1, placed below the reduction area 12, or directly into the transition zone of the reactor 1 between the reduction area 12 and the discharge area. In both the cases this injection allows the DRI carbon content to be regulated.

Described below is an example of a process, when fully operational, for the direct reduction of iron oxides, carried out by means of the described systems of the invention. This process comprises the following steps when fully operational:

a) recovering and treating the exhaust gas exiting the reactor 1 by means of the recovery and treatment line 10;

b) feeding process gas to the reduction area 2 of the reactor 1 by means of the treatment and feeding line 11, said process gas being obtained by mixing the make-up gaseous hydrogen-containing gas coming from the first external source 200 and/or the make-up gaseous hydrocarbon-containing gas coming from the second external source 210 with the exhaust gas treated in the recovery and treatment line 10;

wherein there are further provided the steps of transferring heat from the exhaust gas exiting the reactor 1 to a heat-transfer fluid by means of the first heat-exchange device 22 of the recovery and treatment line 10;

and if the make-up gaseous hydrogen-containing gas coming from the first external source 200, mixed with the exhaust gas treated in the recovery and treatment line 10, is sufficient for the direct reduction process, the heat of the heat-transfer fluid is completely transferred to said process gas by means of the duct 75 carrying the heat-transfer fluid to the second heat-exchange device 72 of the treatment and feeding line 11, crossing said second heat-exchange device 72, and therefore the whole heat-transfer fluid reaches said second heat-exchange device 72; whereas if the make-up gaseous hydrogen-containing gas coming from the first external source 200 is not available or not sufficient, when mixed with the exhaust gas treated in the recovery and treatment line 10, for the direct reduction process, the make-up gaseous hydrocarbon-containing gas coming from the second external source 210 is mixed with said exhaust gas, or with said exhaust gas and said make-up gaseous hydrogen-containing gas, and the heat of the heat-transfer fluid is respectively completely, or partially, transferred to the carbon dioxide removal device 50. Therefore, if the make-up gaseous hydrogen-containing gas is not available the whole heat-transfer fluid reaches the removal device 50. If, instead, the make-up gaseous hydrogen-containing gas is available but not sufficient, the heat-transfer fluid partially reaches both the removal device 50 and the second heat-exchange device 72.

Preferably, in order to better adjust the operation of the direct reduction system there are provided the following steps:

providing input data including a signal (118) indicative of the availability data of the make-up gaseous hydrogen-containing gas;

processing said input data and sending, preferably by means of a control unit 64, a first control signal 110 to the first flow rate adjusting device 62 for adjusting the flow rate of the heat-transfer fluid towards the carbon dioxide removal device 50;

a second control signal 111 to the second flow rate adjusting device 65 for adjusting the heat-transfer fluid flow rate towards the second heat-exchange device 72;

a third control signal 112 to the third flow rate adjusting device 63 for at least partially closing or opening the by-pass duct 52;

a fourth control signal 114 to the fourth flow rate adjusting device 32 for adjusting the flow rate of make-up gaseous hydrocarbon-containing gas to be fed to the circuit;

and a fifth control signal 116 to the fifth flow rate adjusting device 31 for adjusting the flow rate of the make-up gaseous hydrogen-containing gas to be fed to the circuit.

Therefore, if the make-up gaseous hydrogen-containing gas coming from the first external source 200 is available and sufficient, mixed with the exhaust gas treated in the recovery and treatment line 10, for the whole direct reduction process, the second external source 210 is normally closed. The control unit 64 sends respective control signals 110, 111 to the first and second flow rate adjusting devices 62 and 65 and the control signal 114 to the fourth flow rate adjusting device 32 so that the duct 76 and the second external source 210 are closed and the duct 75 is open. Said control unit 64 also sends the control signal 112 to the third flow rate adjusting device 63 and the control signal 116 to the fifth flow rate adjusting device 31 so that, respectively, the by-pass duct 52 and the first external source 200 are open. In this case the removal device 50 is completely bypassed.

When the make-up gaseous hydrogen-containing gas coming from the first external source 200 is available but not sufficient, mixed with the exhaust gas treated in the recovery and treatment line 10, for the whole direct reduction process, the control unit 64 sends, depending on the control signal 118 coming from the gaseous hydrogen-containing gas source a control signal 114 to said fourth flow rate adjusting device 32 for a partial opening of the second external source 210 and, thus, for adjusting the flow rate of make-up gaseous hydrocarbon-containing gas to be fed to the circuit, a control signal 116 to the fifth flow rate adjusting device 31 for adjusting the flow rate of the make-up gaseous hydrogen-containing gas to be fed to the circuit, a control signal 110 to the first flow rate adjusting device 62 and a control signal 111 to the second flow rate adjusting device 65 for respectively adjusting the flow rate of the heat-transfer fluid towards the removal device 50 and the flow rate of the heat-transfer fluid towards the second heat-exchange device 72, said flow rates of the heat-transfer fluid being flexibly set according to the proportion of the amount of gaseous hydrogen-containing gas and the amount of gaseous hydrocarbon-containing gas fed to the circuit of the reduction system;

a control signal 112 to the third flow rate adjusting device 63 for a partial closing of the by-pass duct 52 and for partially feeding the removal device 50, said partial closing and partial feeding being flexibly set according to the proportion of the amount of gaseous hydrogen-containing gas and the amount of gaseous hydrocarbon-containing gas fed to the circuit of the reduction system.

At last, if there is no availability of the make-up gaseous hydrogen-containing gas coming from the first external source 200, the first external source 200 is normally closed. The control unit 64 sends a control signal 110 to the first flow rate adjusting device 62, a control signal 111 to the second flow rate adjusting device 65 and a control signal 114 to the fourth flow rate adjusting device 32 so that the duct 76 and the second external source 210 are open whereas the portion of the duct 75 proximal to the second heat-exchange device 72 is completely closed. Said control unit 64 also sends a control signal 112 to the third flow rate adjusting device 63 and a control signal 116 to the fifth flow rate adjusting device 31 so that, respectively, the by-pass duct 52 and the first external source 200 are closed.

In an example of the process of the invention, the exhaust gas exiting the reactor 1, preferably at a temperature in the range from about 250° C. to about 550° C., is channeled into a duct 5 in the recovery and treatment line 10, which takes it to the first heat exchanger 22 for the cooling thereof.

Optionally, if water is used in the first heat exchanger 22 for cooling the exhaust gas exiting the reactor 1, the heat-transfer fluid in the duct 75 will be steam.

After cooling, the exhaust gas flows through a duct 24 towards the washing and cooling unit 36 to remove water, obtaining a dehydrated gas.

After cooling and dehydration, the dehydrated exhaust gas is split into the two branching ducts 34, 40.

A smaller portion of dehydrated exhaust gas flows through the branching duct 34, having a pressure control valve 30 with which a part of the dehydrated exhaust gas can be purged from the circuit to eliminate undesired accumulations of inert gases. Whereas, the larger portion of the dehydrated exhaust gas flows through the branching duct 40.

The feeding of make-up gaseous hydrogen-containing gas coming from the first external source 200 and/or make-up gaseous hydrocarbon-containing gas coming from the second external source 210 is provided in the treatment and feeding line 11 or in the recovery and treatment line 10.

In case of first external source 200 and second external source 210 connected to the treatment and feeding line 11, said feeding occurs in a stretch of the circuit comprised between the pumping device 42 of the recovery and treatment line 10 and the heating unit 180 of the treatment and feeding line 11, preferably between the removal device 50, or the by-pass duct 52, of the recovery and treatment line 10 and the humidifier 60 of the treatment and feeding line 11.

With reference to FIG. 1, the dehydrated exhaust gas, which flows in the duct 40 is pushed by the pumping device 42, which can be a compressor or a blower, in order to recycle such portion of dehydrated exhaust gas and take it to the reactor 1 again. Downstream of the pumping device 42, the dehydrated exhaust gas flows through the duct 44, passes through the carbon dioxide removal device 50 and/or the by-pass duct 52, and is then mixed in the treatment and feeding line 11 with the make-up gaseous hydrogen-containing gas coming from the first external source 200 and/or with the make-up gaseous hydrocarbon-containing gas coming from the second external source 210, defining the process gas. The carbon dioxide removal device 50 can be completely bypassed by means of the by-pass duct 52 if feeding of the gaseous hydrocarbon-containing gas is not necessary.

Instead, in case of first external source 200 and second external source 210 connected to the recovery and treatment line 10, said feeding occurs in a stretch of the circuit comprised between the washing and cooling unit 36 and the pumping device 42 of the recovery and treatment line 10.

With reference to FIG. 2, differently from the embodiment of FIG. 1, the dehydrated exhaust gas, which flows in the duct 40, is mixed here with the make-up gaseous hydrogen-containing gas coming from the first external source 200 and/or with the make-up gaseous hydrocarbon-containing gas coming from the second external source 210. The gas mixture thus obtained, which defines the process gas, is pushed by the pumping device 42, which can be a compressor or a blower, in order to take said process gas to the treatment and feeding line 11. In particular, downstream of the pumping device 42, the process gas flows through the duct 44, passes through the carbon dioxide removal device 50 and/or the by-pass duct 52, and then reaches the treatment and feeding line 11. The carbon dioxide removal device 50 can be completely bypassed by means of the by-pass duct 52 if feeding of the gaseous hydrocarbon-containing gas is not necessary.

In all of the embodiments, the process gas continues to flow, in sequence, through the possible humidifier 60, the second heat exchanger 72 in which the process gas temperature can be increased, and then through the duct 15 arriving to the heating unit 180 where the process gas reaches a temperature of about 850-950° C.

The humidifier 60 can be completely bypassed by the by-pass duct 80 when only make-up gaseous hydrogen-containing gas is fed to the circuit.

Downstream of the heating unit 180, the process gas flows through the duct 16 until it reaches the inside of the reactor 1.

Downstream of said heating unit 180 and upstream of the reactor 1, a gaseous oxygen injection can be provided into the flow of process gas by means of a gaseous oxygen injection device 300.

Preferably, an injection of a further gaseous hydrocarbon-containing gas, such as natural gas or coke oven gas or gas from biomass or biogas or bio-methane, is provided in a lower, preferably conical, area 14 of the reactor 1, placed below said reduction area 12, or directly into a transition zone of the reactor 1 between the reduction area 12 and a discharge area of the reactor, by means of at least one injection device 191.

The iron oxide material in the form of pellets or lumps is supplied from above into the reduction area 12 of the reactor 1, and reacts with the hot reducing gas, which flows counter current with respect thereto and is finally discharged as Hot DRI.

Optionally, the iron oxide material has a particle size of about 2.5-19 mm; preferably about 3.5-15 mm.

The invention claimed is:

1. A direct reduction system for a direct reduction of iron oxides comprising a gas circulation circuit comprising:
   a reactor having a reduction area adapted for being loaded with said iron oxides;
   a first external source of make-up gaseous hydrogen-containing gas with a gaseous hydrogen gas content equal to at least 80% in volume;
   a second external source of make-up gaseous hydrocarbon-containing gas;
   a recovery and treatment line, placed downstream of the reactor, for recovering and treating an exhaust gas exiting the reactor;
   a treatment and feeding line, placed upstream of the reactor, for treating a process gas, obtained by mixing the make-up gaseous hydrogen-containing gas coming from the first external source and/or the make-up gaseous hydrocarbon-containing gas coming from the second external source with the exhaust gas treated in the recovery and treatment line, and for feeding the reduction area of the reactor with said process gas;
   wherein the recovery and treatment line communicates downstream with said treatment and feeding line;
   wherein the recovery and treatment line comprises at least one first heat-exchange device where heat is transferred from the exhaust gas to a heat-transfer fluid;
   wherein the treatment and feeding line comprises at least one second heat-exchange device;
   wherein a duct, able to carry the heat-transfer fluid, connects the at least one first heat-exchange device to the at least one second heat-exchange device whereby the heat of the heat-transfer fluid can be transferred to said process gas by means of said at least one second heat-exchange device;
   wherein the recovery and treatment line also comprises at least one carbon dioxide removal device for removing carbon dioxide from the exhaust gas;

wherein the duct has a branch connecting said duct to the at least one carbon dioxide removal device whereby the heat of the heat-transfer fluid can be completely or partially transferred to said at least one carbon dioxide removal device; and wherein said first external source and said second external source are connected to said treatment and feeding line or to said recovery and treatment line.

2. The system according to claim 1, wherein there are provided
a by-pass duct in the recovery and treatment line for bypassing said at least one carbon dioxide removal device;
a first flow rate adjusting device for adjusting the flow rate of the heat-transfer fluid towards the at least one carbon dioxide removal device;
a second flow rate adjusting device for adjusting the flow rate of the heat-transfer fluid towards the at least one second heat-exchange device;
a third flow rate adjusting device for at least partially closing or opening the by-pass duct;
a fourth flow rate adjusting device for adjusting the flow rate of the make-up gaseous hydrocarbon-containing gas to be fed to the gas circulation circuit;
a fifth flow rate adjusting device for adjusting the flow rate of the make-up gaseous hydrogen-containing gas to be fed to the gas circulation circuit;
and a control unit configured for sending a first control signal to said first flow rate adjusting device, a second control signal to said second flow rate adjusting device; a third control signal to said third flow rate adjusting device; a fourth control signal to said fourth flow rate adjusting device and a fifth control signal to said fifth flow rate adjusting device according to input data including a signal indicative of availability data of the make-up gaseous hydrogen-containing gas.

3. The system according to claim 1, wherein the at least one second heat exchanger is placed between a humidifier and a heating unit, said humidifier and said heating unit being provided in said treatment and feeding line.

4. The system according to claim 3, wherein the at least one first heat-exchange device is placed between the reactor and at least one washing and cooling unit for removing water from the exhaust gas, obtaining a dehydrated gas, said at least one washing and cooling unit being provided in said recovery and treatment line.

5. The system according to claim 2, wherein the treatment and feeding line, in addition to first ducts through which said process gas is adapted to pass, comprises in sequence
at least one humidifier for adjusting a water content of the process gas;
said at least one second heat exchanger;
at least one heating unit for heating the process gas;
and wherein the recovery and treatment line, in addition to second ducts through which said exhaust gas is adapted to pass, comprises in sequence
said at least one first heat exchanger for cooling the exhaust gas exiting the reactor;
at least one washing and cooling unit for removing water from the exhaust gas, obtaining a dehydrated gas;
at least one pumping device for pumping the dehydrated gas into said treatment and feeding line;
said at least one carbon dioxide removal device and said by-pass duct.

6. The system according to claim 5, wherein, in case of the first external source and the second external source connected to said treatment and feeding line, both said first external source and said second external source are connected to a stretch of the gas circulation circuit comprised between the at least one pumping device of the recovery and treatment line and the heating unit of the treatment and feeding line.

7. The system according to claim 5, wherein, in case of the first external source and the second external source connected to said recovery and treatment line, both said first external source and said second external source are connected to a stretch of the gas circulation circuit comprised between the at least one washing and cooling unit and the at least one pumping device.

8. The system according to claim 5, wherein the second ducts of the recovery and treatment line comprise:
a first branching duct, which connects the recovery and treatment line to burners of the at least one heating unit, and to which a first flow of dehydrated exhaust gas is sent as combustible gas for said burners;
and a second branching duct, which connects the recovery and treatment line to the feeding and treatment line and along which the at least one pumping device and the at least one carbon dioxide removal device are arranged, and in which a second flow of dehydrated exhaust gas is recirculated.

9. A direct reduction process for a direct reduction of iron oxides, carried out by means of a system according to claim 1, the process comprising the following steps when fully operational:
a) recovering and treating the exhaust gas exiting the reactor by means of the recovery and treatment line;
b) feeding the process gas to the reduction area of the reactor by means of the treatment and feeding line, said process gas being obtained by mixing the make-up gaseous hydrogen gas-containing gas coming from the first external source and/or the make-up gaseous hydrocarbon-containing gas coming from the second external source with the exhaust gas treated in the recovery and treatment line;
wherein there are further provided the steps of
transferring heat from the exhaust gas exiting the reactor to the heat-transfer fluid by means of the at least one first heat-exchange device of the recovery and treatment line;
and wherein
if the make-up gaseous hydrogen-containing gas coming from the first external source, mixed with the exhaust gas treated in the recovery and treatment line, is sufficient for the direct reduction process, heat of the heat-transfer fluid is completely transferred to said process gas by means of the duct carrying the heat-transfer fluid to the at least one second heat-exchange device of the treatment and feeding line, whereas
if the make-up gaseous hydrogen-containing gas coming from the first external source is not available or not sufficient, mixed with the exhaust gas treated in the recovery and treatment line, for the direct reduction process, make-up gaseous hydrocarbon-containing gas coming from the second external source is mixed with said exhaust gas, or with said exhaust gas and said make-up gaseous hydrogen-containing gas, and the heat of the heat-transfer fluid is respectively completely, or partially, transferred to said at least one carbon dioxide removal device.

10. The process according to claim 9, wherein there are further provided the following steps:
adjusting a flow rate of the heat-transfer fluid towards the at least one carbon dioxide removal device by means of a first flow rate adjusting device;

adjusting a flow rate of the heat-transfer fluid towards the at least one second heat-exchange device by means of a second flow rate adjusting device;

at least partially closing or opening a by-pass duct provided in the recovery and treatment line, by means of a third flow rate adjusting device, for bypassing said at least one carbon dioxide removal device;

adjusting a flow rate of the make-up gaseous hydrocarbon-containing gas to be fed to the gas circulation circuit by means of a fourth flow rate adjusting device;

adjusting a flow rate of the make-up gaseous hydrogen-containing gas to be fed to the gas circulation circuit by means of a fifth flow rate adjusting device.

11. The process according to claim 10, wherein there are further provided the following steps:

providing input data including a signal indicative of availability data of the make-up gaseous hydrogen-containing gas;

processing said input data and sending by means of a control unit a first control signal to the first flow rate adjusting device for adjusting the flow rate of the heat-transfer fluid towards the at least one carbon dioxide removal device;

a second control signal to the second flow rate adjusting device for adjusting the heat-transfer fluid flow rate towards the at least one second heat-exchange device;

a third control signal to the third flow rate adjusting device for at least partially closing or opening the by-pass duct for possibly bypassing said at least one carbon dioxide removal device;

a fourth control signal to the fourth flow rate adjusting device for adjusting the flow rate of make-up gaseous hydrocarbon-containing gas to be fed to the gas circulation circuit;

and a fifth control signal to the fifth flow rate adjusting device for adjusting the flow rate of the make-up gaseous hydrogen-containing gas to be fed to the gas circulation circuit.

12. The process according to claim 10, wherein, if water is used for cooling the exhaust gas exiting the reactor in said at least one first heat-exchange device, the heat-transfer fluid in the duct is steam.

13. The process according to claim 9, wherein said feeding of make-up gaseous hydrogen-containing gas coming from the first external source and/or make-up gaseous hydrocarbon-containing gas coming from the second external source is provided in the treatment and feeding line or in the recovery and treatment line.

14. The process according to claim 13, wherein, in case of first external source and second external source connected to the treatment and feeding line, said feeding occurs in a stretch of the gas circulation circuit comprised between a pumping device of the recovery and treatment line and at least one heating unit of the treatment and feeding line.

15. The process according to claim 13, wherein, in case of first external source and second external source connected to the recovery and treatment line, said feeding occurs in a stretch of the gas circulation circuit comprised between a washing and cooling unit and a pumping device of said recovery and treatment line.

16. The process according to claim 9, wherein there is provided adjusting an operating pressure of the system to partially or completely compensate a difference of molecular weight due to different percentages of use of the make-up gaseous hydrocarbon-containing gas and of the make-up gaseous hydrocarbon-containing gas.

17. The process according to claim 16, wherein there is provided an injection of nitrogen both for increasing the molecular weight of the circulating process gas and for using the nitrogen present in the circulating process gas as a vector of thermal energy inside the reactor.

18. A system according to claim 5, wherein both said first external source and said second external source are connected to a stretch of the gas circulation circuit comprised between said at least one carbon dioxide removal device, or said by-pass duct, of the recovery and treatment line and said at least one humidifier of the treatment and feeding line.

* * * * *